Figure 1:
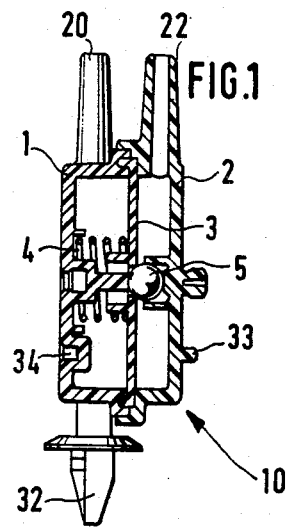

United States Patent [19]

Schenk

[11] 4,089,349
[45] May 16, 1978

[54] MEMBRANE VALVE

[75] Inventor: Bernd Schenk, Hamburg, Germany

[73] Assignee: ITW-Ateco G.m.b.H., Norderstedt, Germany

[21] Appl. No.: 732,575

[22] Filed: Nov. 4, 1976

[30] Foreign Application Priority Data

Oct. 17, 1975 Germany .......................... 2546488

[51] Int. Cl.² .............................................. F16K 7/12
[52] U.S. Cl. ................................... 137/859; 137/884;
251/61.1; 137/DIG. 8
[58] Field of Search ............... 251/61.1; 137/859, 884,
137/DIG. 8

[56] References Cited

U.S. PATENT DOCUMENTS

| 1,120,707 | 12/1914 | Froelich | 251/61.1 X |
| 2,756,773 | 7/1956 | Bauerlein | 137/859 X |

FOREIGN PATENT DOCUMENTS

| 2,402,669 | 1/1974 | Germany | 251/61.1 |
| 1,355,640 | 6/1974 | United Kingdom | 137/859 |

Primary Examiner—Arnold Rosenthal
Attorney, Agent, or Firm—Jack R. Halvorsen; Robert W. Beart

[57] ABSTRACT

A valve including a pressure operated movable diaphragm which selectively seats against a movable ball member.

13 Claims, 8 Drawing Figures

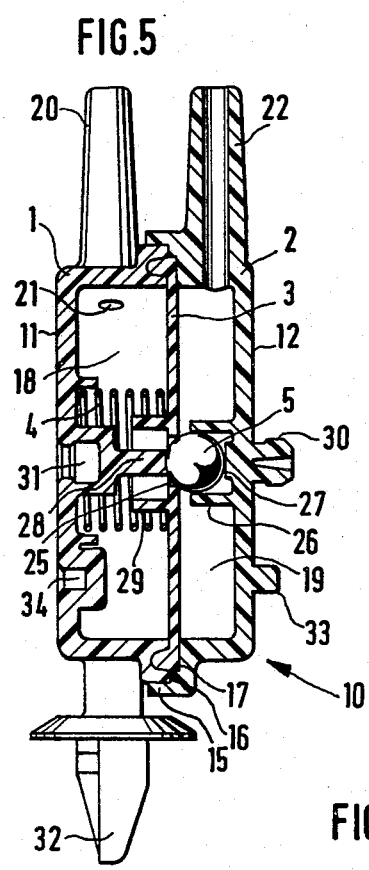
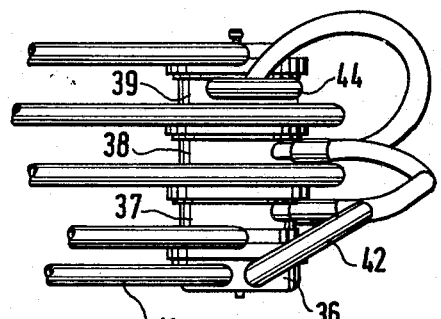
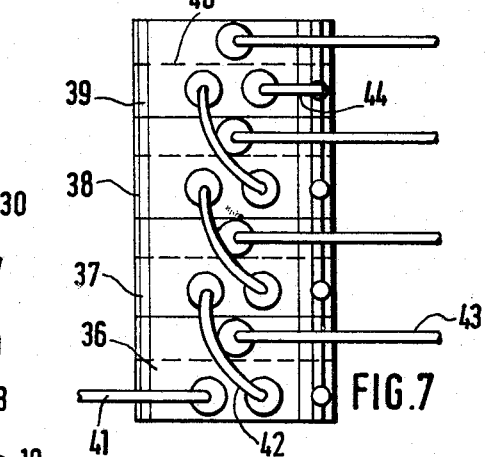
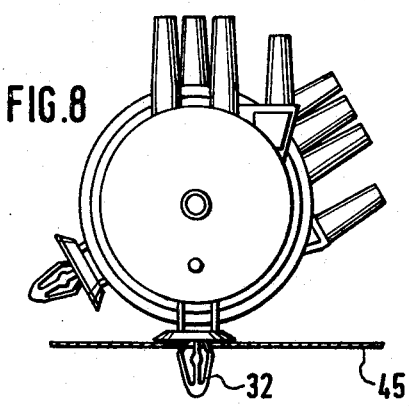

MEMBRANE VALVE

The invention relates to a membrane valve having an elastic membrane element arranged in a valve housing, said element cooperating with a valve seat for selectively separating two chambers in the valve housing, each one of said chambers being provided with at least one fluid connection.

The invention relates in particular to a membrane valve to prevent return flow in fluid lines, for instance, in vacuum lines, fuel lines or fuel systems of automotive vehicles. Check valves for such purposes are required to become responsive in particular with very low pressures and, in addition, are required to guarantee a high degree of safety in operation.

It is known to employ piston type valves as check valves in connection with actuating means working with a vacuum or underpressure in automotive vehicles. Check valves are generally needed in automotive vehicles also for fuel supply; so, for instance, membrane valves are employed in tank closure lids. Also the use of ball type check valves is known.

The highest possible degree of safety in operation is required in particular in underpressure or vacuum operated systems in automotive vehicles. The safety in operation of the valves or slides to be employed here is decisively dependent inter alia upon their constructional design and the material used therefor. What is critical for the safety in operation however, also is the influence of fuel vapours when the intake manifold of the motor is used as the source of vacuum. The fuel vapours may easily arrive at the check valve inserted in the vacuum line from the intake manifold and through said vacuum line. Furthermore, a higher or lesser degree of contamination may affect the functional safety of the valve, particularly so if the medium passing through is not subjected to any filtering action. With the known piston type valves it is possible to counteract the above difficulties only unsatisfactorily, and functional troubles will occur, especially due to heaviness in operation, jamming or too slow responsiveness. Besides, the capability of sealing leaves much to be desired due to too low a degree of surface pressure at the valve seat.

Membrane valves are in a better position to cope with the above problems because they due to their constructional design allow for relatively high degrees of surface pressure at the valve seat. The known membrane valves, however, suffer from the disadvantage that they cause a relatively high wear at the valve seat and, due to too small a valve opening are prone to contamination in this region. With ball type valves, however, the disadvantages to be attributed to membrane valves do not occur and they are insofar superior to ball type valves, however, in their turn suffer from the disadvantage that the surface pressure obtainable at the ball is too low because the effective piston surface positively is small. Therefore, the known ball type valves will no longer close completely tightly already with small contaminations.

All the above mentioned types of valves suffer from the common disadvantage that they do not allow for a type of construction in which they are adapted one to another (module type construction). Especially with larger vacuum systems a series of constructional elements must be secured each individually so that a spatially combined arrangement of the individual valves in such a manner that space requirement, erection and maintenance costs may be reduced to a minimum, would be particularly advantageous.

The invention is based upon the problem of providing a membrane valve, especially for vacuum actuation means for use in automotive vehicles, for example, which affords a high degree of safety in operation and is particularly insensitive to contamination.

This problem is solved in that the membrane element is provided with an opening and that a valve seat element is retained in the valve housing to be capable of limited movement and adapted to be brought into sealing engagement with the edge of the opening.

The valve arrangement according to the invention makes use of the favourable properties of the membrane valve as to responsiveness while avoiding, however, the disadvantage of too rapid wear and contamination by the provision of a valve seat element mounted to be movable in limits and which may be brought into sealing engagement with the sealing opening in the membrane element. The movability of the valve seat due to the movable valve seat element secures a constant cleaning of the valve seat so that even with a contaminated medium the functional safety of the valve is not impaired. Supporting the valve seat element for limited movement in addition offers the advantage that a possible eccentric displacement of the sealing opening due to manufacturing tolerances or later influences may be accommodated and will not impair the sealing properties.

The outer configuration of the movable valve seat element must be of such a nature that an effective sealing is constantly guaranteed between the valve seating surface and the edge of the sealing opening. On the other hand the configuration of the valve seat element must allow for the limited movability in a direction towards the sealing opening and away from it, respectively, and in parallel with respect to the membrane element.

To obtain this object, provision is made in one embodiment of the invention for the membrane opening to be of a circular configuration and for the valve seat element to be a ball. The effectiveness of a valve seat element in the form of a ball in accordance with the invention is guaranteed in particular if it is floatingly supported, i.e. if it is movable in limits in all directions. An effective sealing effect might be obtained already with a valve seat element having a partially spherical surface, with the spherical shape as a whole probably having to be looked upon as being superior. Particularly when using a valve seat ball it will be easily recognized that a displacement of the sealing opening from the center will not prevent the effective sealing engagement between the ball and the sealing opening.

In another embodiment of the invention provision is made for the valve seat element during the opening of the valve or after the valve has been opened to be kept slightly acentric with respect to the membrane opening. A slight displacement of the valve seat element vis-a-vis the axis of the membrane opening is effective to cause movement of the valve seat element upon each engagement with the edge of the opening whereby a cleaning effect is obtained at this location. When using a ball as the valve seat element the latter will always be rotated slightly and will thereby always be cleaned again.

The mounting of the valve seat element for limited movement may be effected in any suitable manner. In an advantageous embodiment of the invention provision is made in this connection for a limiting element to extend in a direction towards the membrane opening on the side of the membrane averted from the valve seat element, said limiting element limiting the movement of the valve seat element in the direction towards the membrane opening. In this connection provision is made in another embodiment of the invention for the valve seat element to be supported by means of a cage which limits a movement of the valve seat element in parallel with respect to the membrane or away from it. The limitation of the movement of the valve seat element in a direction towards the membrane opening is advantageous insofar as upon lifting of the opening edge from the valve seat element the membrane is prevented from following such movement.

The housing of the valve according to the invention may again be designed in any suitable manner. In this connection, provision is made in another embodiment of the invention for the valve housing to consist of two interconnectible shaped members preferably of synthetic material with the membrane fastened and clamped between the two housing portions preferably in a form-closed and positive manner. The housing portions in this arrangement are preferably injection-molded from synthetic stock and are composed and fastened to each other without any additional processing steps, for instance, by welding.

Also the fastening of the membrane within the valve housing may be accomplished in different ways. In one embodiment of the invention provision is made for the membrane for this purpose to comprise an axially extending integrally shaped annular flange on the edge thereof said flange being capable of being inserted at least in part in a correspondingly shaped annular groove formed in the end face of a housing portion while the facing end face of the other housing member comes to lie closely against the membrane on the other side of the annular flange. In this way it is not necessary to provide any additional means for the clamping of the membrane in the valve housing, rather, the membrane is fastened along with the assembly of the housing.

As has been explained already above, the membrane valve according to the invention is especially suited for assembly in automotive vehicles. In order to facilitate the mounting of the valve in accordance with the invention provision is made in another embodiment of the invention for a fastening element to be arranged at the valve housing, preferably a plug-in type element in the form of an expansion rivet or the like. When using synthetic material as the material for the housing, the plug-in type element is preferably formed integrally with one housing member.

With larger systems comprising several constructional members to be checked by a valve it is advantageous to arrange the individual valves in a manner to cause a minimum of expenses in terms of mounting work and material while at the same time providing favourable conditions for maintenance and repair. In this connection, another embodiment of the invention provides for one of the two chambers to have two connections in the valve housing. In the case of a vacuum system the downstream chamber is provided with two connections while with a pressure system the upstream chamber possesses the two connections. In this manner it is possible to connect as many valve units as may be desired in common to a pressure or vacuum source for the purpose of supplying a series of actuation units. It is furthermore possible by simply changing the plugged connections to test any valve unit that may be desired for its function independently of the others without said measure requiring any additional elements.

It is in the interest of a spatially favourable and safe arrangement of several valves in accordance with the invention if the valve housing in accordance with the invention comprises two smooth outer surfaces preferably extending in parallel with respect to each other, with the connections arranged between said outer surfaces and fastening means being provided for fastening two or several valve housings to each other. In accordance with another embodiment of the invention center feeding pins may be provided as fastening means which are inserted in corresponding arresting openings respectively formed at the opposite outer surface.

Figure 3:
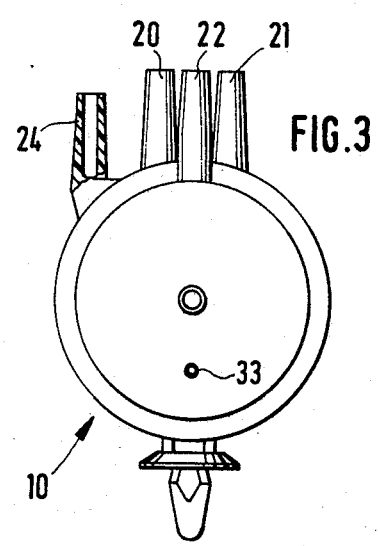
Figure 2:
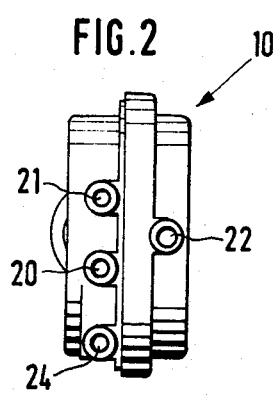
Figure 4:
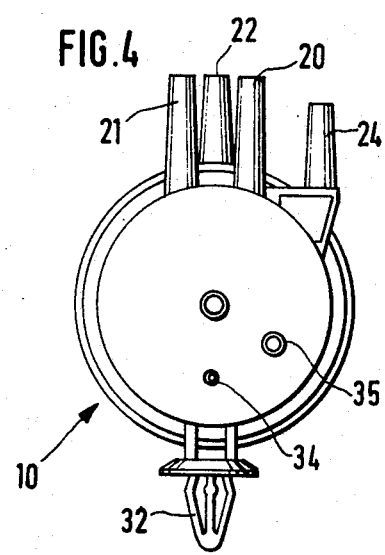

One embodiment of the invention will now be described in more detail by way of the drawings, wherein, FIG. 1 shows a sectional view of a membrane valve in accordance with the invention, FIG. 2 shows a top plan view taken on the valve according to FIG. 1, FIG. 3 a side view of the valve shown in FIG. 1, FIG. 4 shows another lateral view of the valve according to FIG. 1, FIG. 5 shows the valve according to FIG. 1 on an enlarged scale, FIG. 6 shows the arrangement of four valves according to FIG. 1, FIG. 7 shows the arrangement according to FIG. 6 in a diagrammatic view, FIG. 8 shows a side view of the arrangement according to FIG. 6.

In the following specification reference will be first had to FIGS. 1 and 5. These Figures show a sectional view of a disc-shaped valve housing 10 having two outer surfaces 11, 12 extending in parallel. The valve housing 10 is formed of two housing members 1, 2 each formed in one piece from synthetic material. The housing member 1 is provided with a radial flange 13 having an annular groove 14 formed therein in the end face thereof. A radial flange 15 of the housing member 2 grips over the annular flange 13, while a stepped end face 16 of the housing member 1 comes to lie closely against the facing end face of the annular flange 13 and against a membrane 3, respectively, which is provided with an axial annular flange 17 at the edge thereof, said flange engaging within the annular groove 14. The connection of the two housing members 1, 2 is effected in the two portions abutting each other radially outside the membrane 3 by welding. The membrane 3 subdivides the interior of the housing 10 into two chambers 18, 19. Chamber 18 is provided with two connections 20, 21 (see FIGS. 2 to 4) in the form of connecting pieces tapering towards the ends thereof onto which hoses may respectively be plugged. The chamber 19 is provided with one connection 22 designed in a similar way as the connections 20, 21. Besides, the housing member 1 still comprises one blind connection 24 likewise in the form of a connecting piece, comprising however only a blind bore. The connections 20 to 24 are formed integrally at the accociated housing members 1 and 2, respectively.

The membrane 3 is provided with a center opening 25 which cooperates with a ball 5 supported in a cage 26 formed integrally with the housing 2 in a circular portion of the housing member 2 inside thereof. The cage 26 is dimensioned such that the ball 5 is kept therein to be capable of limited movement with the movement of the ball away from the opening 25 being limited by an abutment surface 27. Movement of the ball 5 in the opposite direction is taken care of by means of a dwell-down pin 28 formed integrally with the inside of the circular portion of the housing member 1 approximately in the center thereof. The cage 26 which is of a circular cross sectional area is slightly laterally offset with respect to the axis of the opening 25.

A spring 4 is arranged in the chamber 18 which is supported by its one end at the housing portion 1 and by its other end at the membrane 3 in order to urge the latter in a direction towards the ball 5.

In order to increase the stiffness of the membrane 3, there is an axial flange 29 formed integrally therewith on the side facing away from the ball, said flange annularly surrounding the opening 25.

An expandable fastening journal 30 projects from the outer surface 12 of the housing member 2 the axis of said journal coinciding with the axis of a recess 31 shaped in correspondence with said journal in the surface 11. It is possible with the aid of fastening journal 30 and arresting opening 31 to fasten as many valve housings 10 as may be desired coaxially with respect to, and abutting each other.

The housing member 1 finally has integrally formed thereat in a conventional manner of construction an expandable rivet 32 for the purpose of fastening the valve housing 10 in a fastening bore. There is furthermore a positioning projection 33 formed eccentrically at the outer surface 12 of the housing member 2 and integrally therewith, while the outer surface 11 of the housing member 1 contains two positioning recesses 34, 35. In this manner two valve housings may be connected with each other in two defined positions (FIG. 8). In this manner there are needed for the defined fastening of a plurality of valves on a smooth plate only a limited number of fastening bores because the projecting fastening elements may be pivoted out of the way.

The mode of operation of a valve arrangement according to FIGS. 1 to 5 is as follows: With one individual valve being inserted one of the connections 20, 21 is closed by connection to the blind connection 24, for example. Let us furthermore assume that the valve arrangement is inserted in a so-called vacuum system in which actuation of an actuation unit is by means of underpressure. The output of a vacuum source is therefore connected across the connection 20 or 21, so that the medium such as air, for example, flows from connection 22 via the chamber 19, the opening 25 and the chamber 18 to the connection 20 or 21. The underpressure in chamber 18 must obtain a certain though only low value so that the sealing engagement between the ball 5 and the edge of the membrane opening 25 is abolished. The hold-down pin 28 in addition prevents the ball 5 from following the opening 25 when the membrane is adjusted to a position further inside the chamber 18 against the force of the spring 4. If the underpressure in chamber 18 is not sufficient or even higher than in chamber 19, the sealing engagement of the ball 5 with the opening 25 will prevent any passage flow from taking place through the valve arrangement. The eccentric mounting of the ball 5 with respect to the center opening 25 with play in the valve leads to the ball 5 being slightly rotated each time whereby a cleaning effect is obtained on the valve surfaces.

As already explained above, several valve arrangements or as many valve arrangements as may be desired may be plugged together in a simple manner. This is shown in FIGS. 6 to 8. In the representation according to FIG. 7 there are four valves 36 to 39 connected with each other in abutting relationship, the dash-dotted lines 40 being meant to indicate the membrane. The valve 36 has one chamber connected to a vacuum source via a line 41, for instance, the intake manifold of an Otto motor. As will furthermore be seen from FIG. 7, the second connection of the downstream chamber is respectively connected with the first connection of the same chamber via connecting lines 42, while the second chamber is respectively connected with an actuating unit via its connection and a line 43. Only the second connection of the "last" valve 29 is connected with the blind connection via a connecting line 44 (see FIGS. 2 to 4). In this way the valves 36 to 39 are connected in parallel in a simple manner.

The spatial arrangement of the schematic representation according to FIG. 7 may be seen from FIG. 6.

It has already been mentioned further above that the valve housings of several valves plugged together may assume two different positions with respect to each other. This may be seen from the representation according to FIG. 8 from which it will be seen how a valve is retained in a sheet metal member 45 via an expansion element 32.

When switching in common all the valves built-up in a module type construction and connected with each other according to FIG. 7 each individual valve may be tested for its capability of functioning without the aid of any other elements. Assuming that valve 38 is to be tested. For this purpose it is only necessary to remove the connecting line 42 between the valves 37 and 38 from the connection of the valve 38 and to connect the line 41 with the first connection. Besides, the connection line 42 between the valves 38 and 39 is removed from valve 39 and this end is plugged to the blind connection of the valve 38. With this manner of switching only the desired valve 38 is in operation.

I claim:

1. A membrane valve having an elastic membrane element arranged in a valve housing and cooperating with a valve seat for the selective separation of two chambers in the valve housing, said two chambers each being provided with at least one fluid connection, characterized in that the membrane element (3) is provided with a centrally disposed opening (25) a valve seat element (5) retained in the valve housing (10) with said seat element being capable of limited movement and adapted to be brought into seating engagement with the edge of said membrane opening (25), said membrane opening (25) is of a circular shape and said valve seat element is a ball that is supported for limited floating relationship relative to said membrane opening in such a fashion that during the opening of the valve or after the opening of the valve said valve seat element is maintained coaxially with respect to said membrane opening (25), a limiting element (28) positioned on the side of said membrane (3) facing away from said valve seat element (5) and extending coaxially in a direction towards and relative to said membrane opening, said limiting element adapted to extend through said opening and limit the movement of said valve seat element (5) in a direction towards said membrane opening (25).

2. Valve according to claim 1, characterized in that the valve element (5) is supported by means of a cage(26) which limits a movement of the valve seat element (5) in parallel with respect to the membrane (3) or away from said membrane.

3. Valve according to claim 1, characterized in that there is a spring (4) engaging at the membrane (3) on the side of the membrane (3) facing away from the valve seat element tending to urge the membrane in a direction towards the valve seat element (5).

4. Valve according to claim 3, characterized in that the valve housing (10) consists of two members (1,2) capable of being connected with each other and preferably formed of synthetic material and that the membrane (3) is fastened and clamped between the two housing members (1,2) preferably positively and in a form-closed manner.

5. Valve according to claim 4, characterized in that the membrane (3) comprises an axially extending annular flange (17) integrally formed on the edge thereof which is capable of being inserted at least in part in a correspondingly shaped annular groove (13) in the end face (16) of a housing member (1) while the facing end face of the other housing member (2) comes to lie closely against the membrane (3) on the other side of the annular flange.

6. Valve according to claim 1, characterized in that the limiting element (28) is integrally formed at the one housing member (1) and is preferably designed in the manner of a projection in the form of a pin.

7. Valve according to claim 6, characterized in that the cage (26) is formed integrally at the other housing member.

8. Valve according to claim 1, characterized in that there is a fastening element (32) provided at the valve housing (10).

9. Valve according to claim 1, characterized in that one chamber (18) is provided with two connections (20,21).

10. Valve according to claim 9, characterized in that there is a blind connection (24) provided at the valve housing (10).

11. Valve according to claim 1, characterized in that the valve housing (10) comprises two smooth, preferably parallel outer surfaces with the connections (20-24) arranged between said outer surfaces and with fastening means (30,31) being provided for the purpose of fastening two or more valve housings (10) to each other.

12. Valve according to claim 11, characterized in that there is a preferably centric expansion journal formed integrally at the one outer surface (12) and an arresting opening (31) corresponding to the expansion journal likewise preferably formed centrally in the other outer surface (11).

13. Valve according to claim 11, characterized in that there are positioning means (33,34) provided at the outer surfaces (11,12) for the purpose of fastening two like valve housings (10) to each other in a predetermined position.

* * * * *